United States Patent [19]

Swilley

[11] Patent Number: 4,653,145
[45] Date of Patent: Mar. 31, 1987

[54] ROTATABLE LIVESTOCK HEAD SPLITTER

[75] Inventor: Wilson H. Swilley, Persia, Iowa

[73] Assignee: The Cincinnati Butchers' Supply Company, Cincinnati, Ohio

[21] Appl. No.: 805,357

[22] Filed: Dec. 5, 1985

[51] Int. Cl.$^4$ .............................................. A22B 5/20
[52] U.S. Cl. .................................. 17/1 R; 83/411 R; 17/23
[58] Field of Search ............... 17/1 R, 23, 24; 83/267, 83/411 R, 106, 157

[56] References Cited

U.S. PATENT DOCUMENTS

| | | | |
|---|---|---|---|
| 3,105,993 | 10/1963 | Cook et al. | 17/23 |
| 3,459,079 | 8/1969 | De Gain | 83/267 X |
| 3,706,249 | 12/1972 | Bruckner | 83/267 X |
| 3,890,673 | 6/1975 | Neubauer | 17/1 A |
| 4,052,769 | 10/1977 | Thillet et al. | 17/23 |
| 4,090,275 | 5/1978 | Jorgensen et al. | 17/24 |
| 4,414,708 | 11/1983 | Sauvago | 17/1 R |

Primary Examiner—Willie G. Abercrombie
Attorney, Agent, or Firm—Lloyd L. Zickert

[57] ABSTRACT

A livestock head splitter for splitting the head of an animal for recovering head organs including a plurality of circumferentially arranged head trays or holders rotatably movable through loading, head-splitting and discharge stations. A vertically reciprocal blade is provided above each tray or holder and rotatably moves with the tray or holder so that it is always aligned to split a head positioned on the tray or holder. The split heads are automatically discharged at the discharge station. A hydraulic drive system rotates the trays and drives the knives during the movement of the trays through the head-splitting station. Control means at the head-splitting station causes operation of the head-splitting knife. A protective cover encloses the apparatus and only allows an operator ingress for loading a head onto a tray as it moves through the loading station.

25 Claims, 10 Drawing Figures

FIG-1

FIG_5

ROTATABLE LIVESTOCK HEAD SPLITTER

DESCRIPTION

This invention relates in general to an apparatus for splitting the heads of livestock for recovering head organs, and more particularly to an apparatus for handling a plurality of heads for continuous head-splitting operations.

BACKGROUND OF THE INVENTION

Heretofore, it has been known to provide apparatuses for splitting the heads of animals to recover internal organs such as the brain and pituitary gland. For example, the brain of a hog is edible and the pituitary gland is useful in the production of insulin.

One type of device is the well known single station configuration including a stand on which the head is positioned and a vertically reciprocal knife or blade that descends onto the head and effects the splitting operation. One such device is disclosed in U.S. Pat. No. 3,105,993 and which requires manual loading of the head and manual unloading of the split head. A similar type device is disclosed in U.S. Pat. No. 4,052,769, although especially adapted for bovine livestock.

Another apparatus intended to provide greater production includes a single head-splitting station defined by a cabinet having a splitting knife and gates for completely closing the cabinet during the splitting operation. This type of device is shown in U.S. Pat. No. 3,890,673, which includes a movable bed or head support means indexed through the head-splitting cabinet. Because of the safety gate structure for closing the cabinet during each head-splitting operation and the necessity to index the bed when moving heads into and out of the splitting cabinet, a rather complex structure is provided that requires considerable maintenance and is incapable of high production.

Another apparatus heretofore known includes a rotary blade that is disposed above a conveyer and which requires movement of the conveyer head support relative to the rotatable blade during rotatable blade movement. This device, disclosed in U.S. Pat. No. 4,414,708, while not known to ever having been manufactured, is believed to be unsatisfactory as initial contact of the head by the blade during movement of the conveyer can produce tilting of the head that would result in inaccurate splitting of the head and sometimes damaging of the internal organs.

SUMMARY OF THE INVENTION

The present invention obviates the difficulties heretofore experienced by prior known head-splitting devices in providing an apparatus for continually splitting livestock heads that is capable of providing accurate head-splitting operations and also capable of improving the production over heretofore known head-splitting devices, and in particular capable of providing the utmost safety for the operator.

The device of the present invention includes a plurality of circumferentially arranged and generally horizontally disposed head trays or holders that are driven along a circular path within an operator protective cage or shield. A vertically movable knife blade is provided in alignment with and rotatable with each head tray or holder. An operator stands at the loading station which allows ingress into the protective shield to permit loading of a head onto a tray or holder as it moves through the loading station. Thereafter, the tray with a head moves through a head-splitting station, at which time the splitting knife descends to carry out the splitting operation, and following the splitting operation and the retraction of the head-splitting knife or blade, the tray moves through a discharge station where the slit head is automatically discharged from the device so that it may be transferred to another station for further processing. Control means is provided for guarding against operation of the head-splitting knife except when it passes through the head-splitting station which is completely enclosed by the protective shield. While the trays are intended to be continually moving, the operator has the capability of stopping the tray movement and even reversing it, if necessary.

Accordingly, heads are manually loaded into the device and automatically discharged from the device after they have been subjected to the splitting operation. The operator thereby handles only the head at the loading station of the device, thereby minimizing the chance of injury from operation of the device. The continual operation of the device results in high production, while at the same time maintaining the utmost safety for the operator.

In one embodiment of the invention, the heads are supported on trays that are normally disposed in a horizontal position and which are hinged so that they can swing downwardly at the discharge station for automatically discharging the head after it has been split. In another embodiment of the invention, the heads are supported on holders that are always maintained in horizontal disposition even through the discharge station where a stationary member in the form of a plow or comb is disposed between the holder and the raised splitting blade to cause automatic discharge of the head from the holder when the holder passes through the discharge station. The head is scraped off the side of the holder and dropped down to a chute for further handling. Protective devices are provided in each of the embodiments to assure utmost safety to the operator. Operation of the splitting knives is accomplished by energizing a double-acting hydraulic cylinder having a control valve that is mechanically or electromechanically operated in the head-splitting station.

It is therefore an object of the present invention to provide a new and improved livestock head-splitting device.

Another object of the invention is to provide a livestock head-splitting device that requires manual loading by an operator and automatic discharge of the split heads.

Still another object of the invention is to provide a livestock head splitter that includes a plurality of rotatable head-splitting units rotating through loading, head-splitting and discharge stations, wherein the operator only has access to the loading station and the units can only be cycled through the headsplitting operation during movement through the enclosed head-splitting operation.

A further object of the invention is in the provision of a headsplitting device having a plurality of head-splitting units rotating through loading, head-splitting and discharge stations, and which includes means for preventing the knife from descending except in the head-splitting station, and means for detecting the position of the blade which is disposed between the head-splitting station and the discharge station.

A still further object of the invention is to provide a head-splitting device having a plurality of rotatable head-splitting units rotating between headsplitting discharge stations which includes a mechanically actuated device in the head-splitting station for triggering the head-splitting cycle of each unit as it moves through each station.

Another object of the invention is to provide a head-splitting device having a plurality of head-splitting units rotating through loading, head-splitting and discharge stations and which is provided with a plurality of safety features for guarding against injury to an operator.

Other objects, features and advantages of the invention will be apparent from the following detailed disclosure, taken in conjunction with the accompanying sheets of drawings, wherein like reference numerals refer to like parts, in which:

DESCRIPTION OF THE INVENTION

The embodiment of the invention utilizing trays or holders that swing down for discharging the split head at the discharge station is shown in FIGS. 1 to 4, while the embodiment of the invention that utilizes a head holder that remains in horizontal position and coacts with a stationary plow or scraper to remove the head from the holder is illustrated in FIGS. 5 to 10. The head supporting units in both embodiments are continually driven through a circular path and during one revolution each unit moves through a manual loading station, a head-splitting station, and a discharge station. Each embodiment includes saftey devices for protecting the operator against injury.

Figure 1:
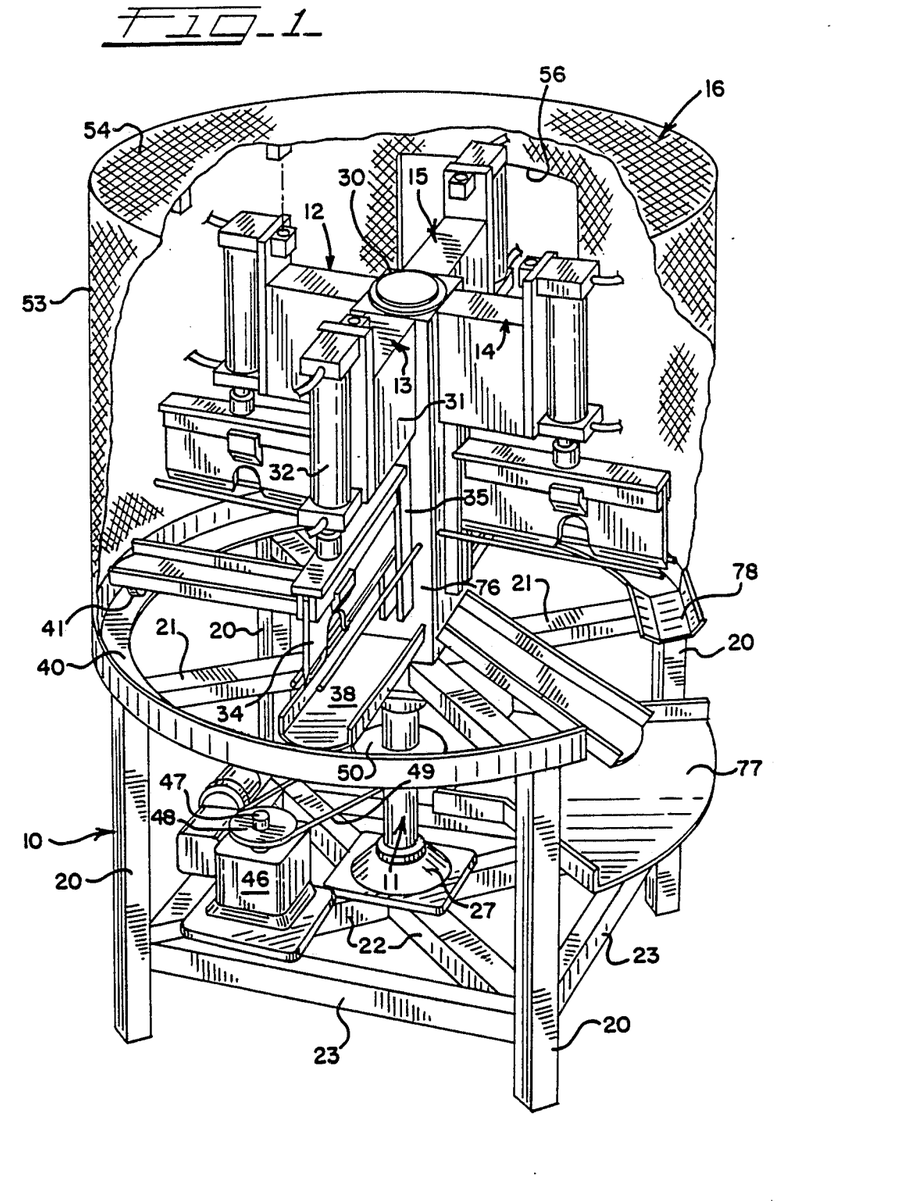
FIG. 1 is a perspective view of the head-splitting device of the present invention with parts cut away for purposes of simplicity.
Figure 2:
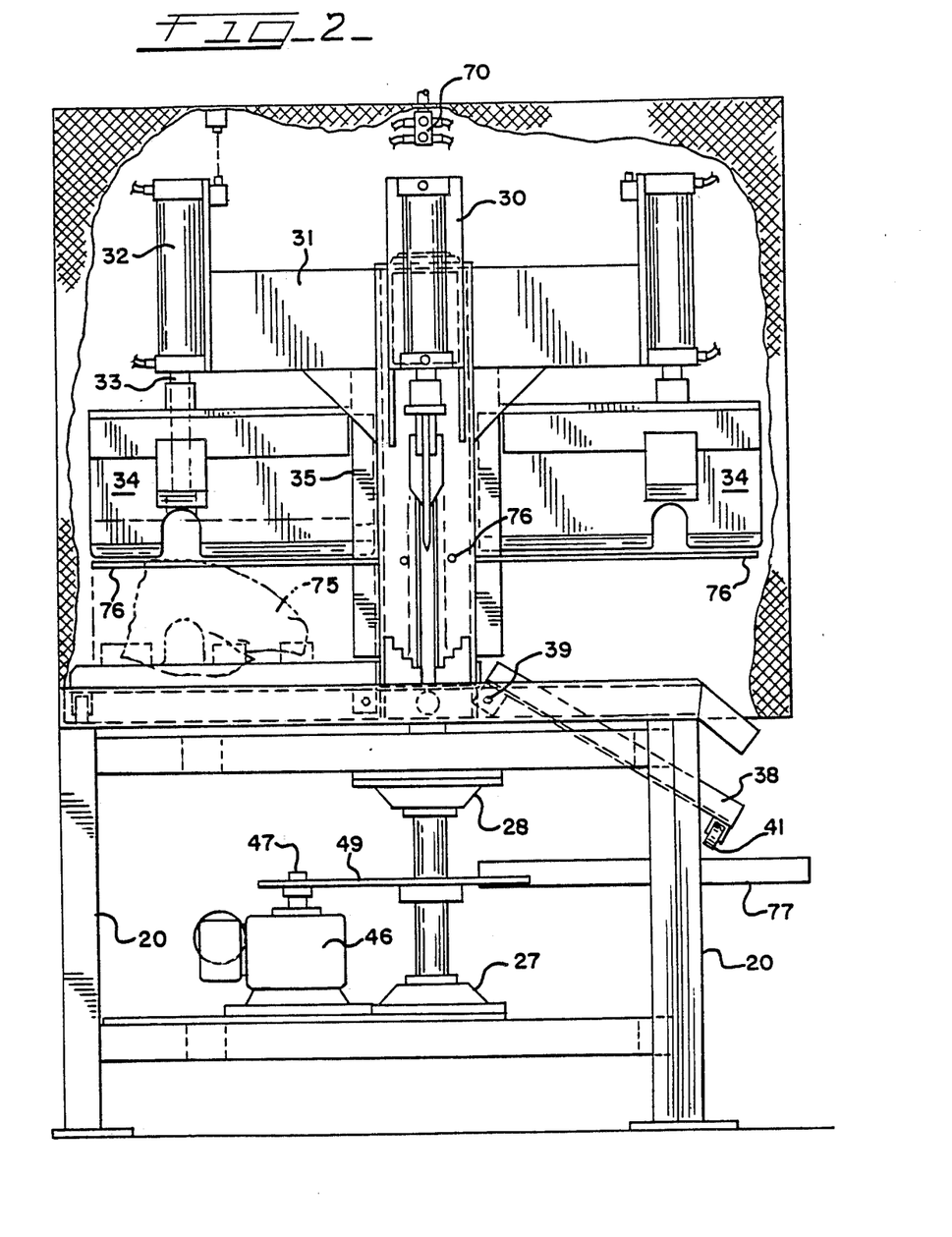
FIG. 2 is a vertical elevational view of the device of the invention with parts cut away for purposes of clarity and illustrating particularly in phantom the positioning of a livestock head on a tray and the swinging down of the tray at the discharge station for purposes of discharging the split head from the device.
Figure 3:
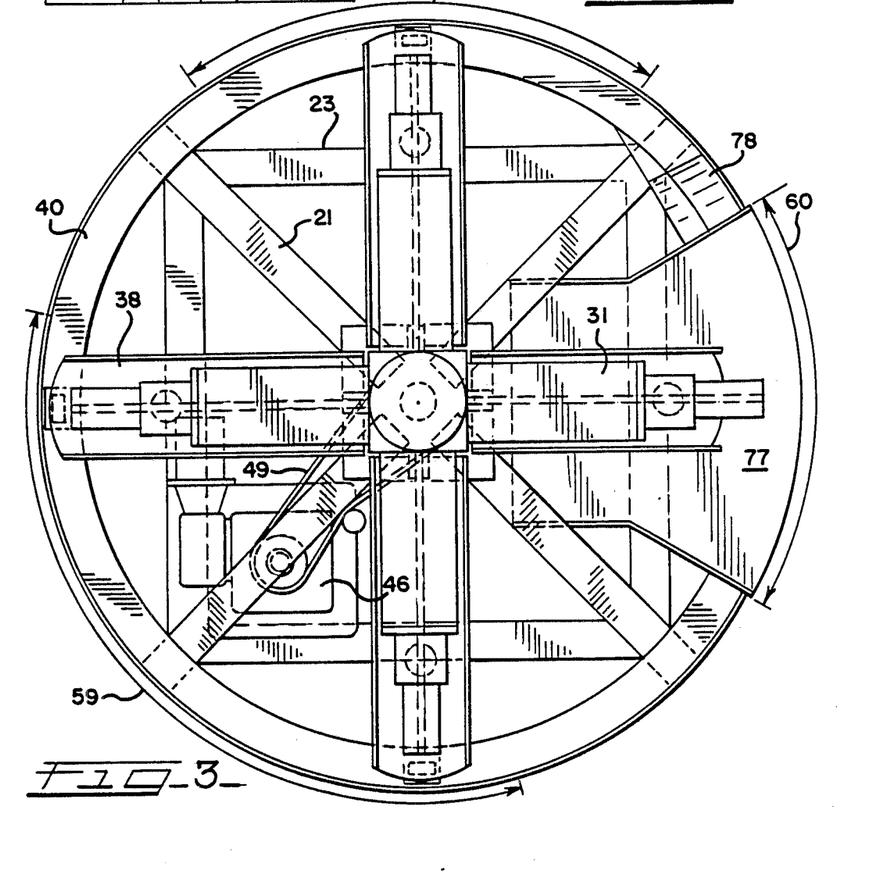
FIG. 3 is a top plan view of the device of FIGS. 1 and 2 with some parts cut away for purposes of clarity.

Referring now to the drawings and particularly to FIGS. 1, 2 and 3, the head-splitting device of this embodiment generally includes a frame 10 rotatably supporting a vertical shaft 11. Positioned at its upper end are a plurality of head-splitting units 12, 13, 14 and 15 within a protective shield, cage or guard 16 that is formed of expanded metal screen material or other suitable material. The head-splitting units are rotatably driven through loading, headsplitting and discharge stations wherein heads are singly loaded at the loading station, split in the head-splitting station, and discharged from the device at the discharge station in split condition so that the internal organs may easily be removed.

The frame includes four upstanding legs 20, diagonally arranged upper and lower reinforcing bars 21 and 22, and additional parallel opposed reinforcing bars 23 connecting with the lower reinforcing bars. Thus, the upper bars 21 are connected to the legs 20, while the lower bars 22 and 23 are connected to the legs 20 to provide a rigid frame or stand for supporting the vertical shaft 11 and the head-splitting units.

The vertical shaft 11 is rotatably received in a lower bearing member 27 suitably secured to the lower reinforcing bars 22 and 23 and an upper bearing member 28 suitably secured to the upper reinforcing bars 21.

Above the upper bearing 28 a square-in-cross-section hub 30 is carried by the shaft 11 and from which extend the head-splitting units 12, 13, 14 and 15. Each head-splitting unit is identical, and while four are illustrated, it may be appreciated that any number of units may be provided. For purposes of simplicity, only one of the head-splitting units will be specifically described hereafter.

Each head-splitting unit includes a radially extending support bracket 31 mounting at its outer end a vertically disposed fluid motor in the form of a double-acting hydraulic cylinder 32 having a movable piston 33. Suitably attached to the piston 33 is a knife or blade 34 of the type for splitting whatever animal head for which the device is designed. The rear edge of the blade 34 is guided during its vertical movement by guide members 35 carried by the hub 30. Directly below the knife is disposed a head tray 38 which is swingably mounted at its inner end to the hub 30 by means of a hinge 39 and generally maintained in the horizontal position by a cam and cam follower system associated with its outer end. The cam system includes a circular cam track 40, suitably secured to and supported by the frame, engaging cam followers in the form of rollers 41 extending from the lower side of the outer ends of each tray 38. The cam track is split at the discharge station to allow the head tray to swing downwardly for discharging the split head from the tray.

The shaft 11 and head-splitting units are rotatably driven by a hydraulic motor 46 mounted on the lower reinforcing bars 22 and 23. The motor has an output shaft 47 on which a pulley or sprocket 48 is mounted for driving a belt or chain 49 that is in turn trained around a pulley or sprocket 50 carried on the shaft 11. It may be appreciated that an electric or other type of motor may be provided if so desired for purposes of rotatably driving the shaft 11. The advantage of a hydraulic motor is in the provision of a hydraulic drive for not only driving the shaft but also for driving the hydraulic cylinders on the head-splitting units.

A protective shield or cover 16 is in the form of expanded metal that has an upstanding cylindrical wall 53 and a top wall 54, all of which is supported on the frame of the device and particularly it may be suitably secured to the cam track 40. The only opening in the protective cover is at the loading station wherein an opening 56 is provided for purposes of loading heads onto the trays as the head-splitting units pass the loading station. This guards against inadvertent contact with the moving splitting units at other than the loading station.

Particularly, as seen in FIG. 3, the loading station designated at 58, covers about 60 degrees of a revolution. The head-splitting station follows and covers about 120 degrees of the revolution and is designated as 59. The discharge station also covers about 60 degrees travel of the head-splitting units and is disposed between the loading station and the head-splitting station and designated by the numeral 60. Thus, after a head is loaded at the loading station 58, it is sequentially driven through the head-splitting station 59 during which the headsplitting operation is completed, and then through the discharge station 60 where the split head is discharged from the machine. Continual loading of the headsplitting units effects continuous head-splitting operations by the device.

Figure 4:
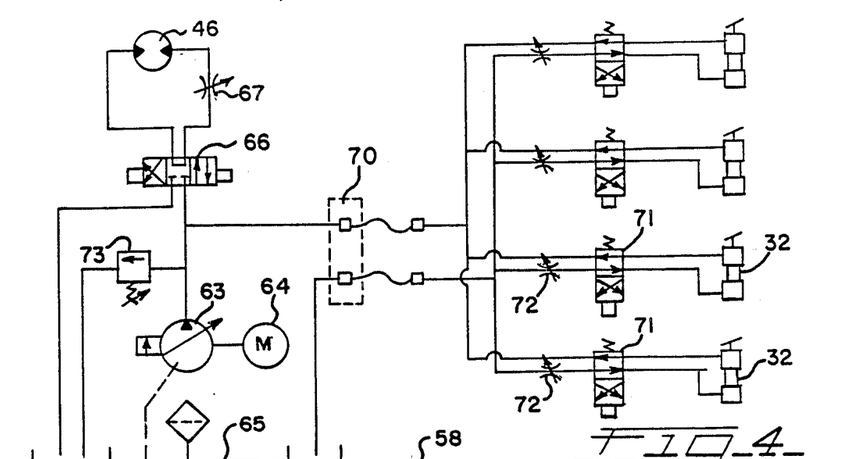
FIG. 4 is a schematic view of the hydraulic drive system for operating the device of the invention.

The hydraulic drive for the splitter device of the invention is shown schematically in FIG. 4. This system includes a pump 63 driven by a motor 64 which generates a high pressure supply for both the hydraulic cylinders 32 and the hydraulic motor 46. Fluid is taken from the reservoir 65 and pressurized before feeding to a three-position four-way control valve 66 capable of driving the motor 46 in either direction or stopping the motor. The operator preferably drives the control valve with a foot-operated pedal or the like. The control valve 66 has a return line to the reservoir and a flow control valve 67 is provided to control speed.

The pump 63 also supplies high pressure fluid to a rotating union 50 located at the top of the device and mounted to the cover which in turn provides both high pressure and low pressure lines to the hydraulic cylinders 32 through electrically energized four-way two-position control valves 71. A flow control valve 72 is provided for controlling the speed of operation of the cylinder 32. Valves 71 are preferably solenoid operated for causing the two-way hydraulic cylinders to drive the knife for splitting a head through the head-splitting cycle and then the return cycle to its home position. A pressure relief valve 73 is provided to prevent damage to the hydraulic system.

A suitable triggering mechanism is provided for energizing and deenergizing the solenoid operated hydraulic cylinder control valve 71. Such a mechanism may take the form of a limit switch responding to a suitable actuator mounted in fixed position relative to the rotating head-splitting units, photosensitive devices, a powered electrical track or wire in the area of the headsplitting station engageable by contacts of the solenoid operated control valves, or any other suitable mechanism which would only permit operation of the cylinders and the head-splitting cycle of a knife, while the head-splitting unit is traversing the head-splitting station 59.

The three-position control valve 66 in effect controls the operation of the drive motor 46 and the hydraulic cylinders 32, for when this valve is positioned to stop the motor 46, the hydraulic cylinders cannot be operated except the one that is in the head-splitting station, and it maintains whatever position attained when the rotational movement of the head-splitting units has ceased.

In operation, an operator stands at the loading station 58 and loads heads one at a time onto a tray positioned at or moving through the loading station. These trays are provided with suitable blocks or wedges for supporting the heads in the desired position, as seen particularly in FIG. 2. A hog's head 75 is illustrated in the position placed by the operator. In this respect the operator inserts or loads the head nose first and forehead down to the position where it is exposed centrally below the knife blade so that when the blade descends it will split the head into two substantially equal halves in the head-splitting station. The blades are formed with a recess in a conventional manner to avoid cutting the organs.

The knife blade is in the home or up position at all times except when cycling in the head-splitting station, and therefore it is in the up position when the head is loaded at the loading station. As a loaded tray moves through its rotational path, the blade remains in the home position until the head-splitting unit enters the head-splitting station 59. At that point, the solenoid operated control valve for the hydraulic cylinder of that head-splitting unit is triggered to cause the double-acting cylinder to drive the knife blade downwardly and through a head-splitting cycle. By the time the blade reaches its lowermost position, the head-splitting unit has advanced to a point in the head-splitting station where it then receives a signal to cause the knife blade to go through the return cycle and back to home position. A pair of wiper bars 76, as seen in FIG. 1, extend from the hub 30 one on each side of the blade to wipe the head from the blade if the head has a tendency to stick to the handle when the blade moves vertically to the home position.

Following the head-splitting operation, the head-splitting unit then advances into the discharge station 60 where the tray swings downwardly when the cam follower for the tray falls off the end of the cam track, thereby causing the head to be discharged onto a lower table 77 so that it can then be removed for further processing. As the downwardly positioned tray continues to advance, the cam follower engages an inclined track portion 78 causing the outer end of the tray to move upwardly until it then reaches the level of the cam track 40 and is once again horizontally disposed and ready to be again loaded with another head as it passes through the loading station 58.

Usually there is enough time for the operator to load a head onto a tray as it continuously moves through the loading station, but should complications arise, the operator would merely operate the foot control member and stop the rotation of the unit so that proper placement of the head can be made before the tray moves into the head-splitting station. it can therefore be appreciated that the operator only controls the blade movement by controlling the rotation of the head trays. The operator does not have the capability of operating the head-splitting cycle of the head-splitting units except by driving a head-splitting unit through the completely enclosed head-splitting station 59 where a triggering mechanism is situated for triggering the operation of the head-splitting cylinder. Further, the operator does not deal with the discharge or unloading of the heads from the trays, as this is handled automatically as the trays move through the discharge station. Thus, a head is manually loaded into the head-splitting device of the invention and automatically discharged at the discharge station, and utmost safety of the operator is achieved.

Referring now to the embodiment of the invention disclosed in FIGS. 5 to 10, this embodiment differs from the embodiment of FIGS. 1 to 4 in that it includes other important safety features that are unique, and further in that the head trays or holders remain horizontally disposed in the discharge station and coact with a stationary plow or scraper to remove the head from the tray. While not shown, this embodiment likewise includes a protective shield in the form of a screen of expanded metal or the like similar to the guard 16 illustrated in FIG. 1 of the first embodiment which prevents the operator or any person from reaching into the device except at the loading station where a head is loaded onto a tray.

Figure 5:
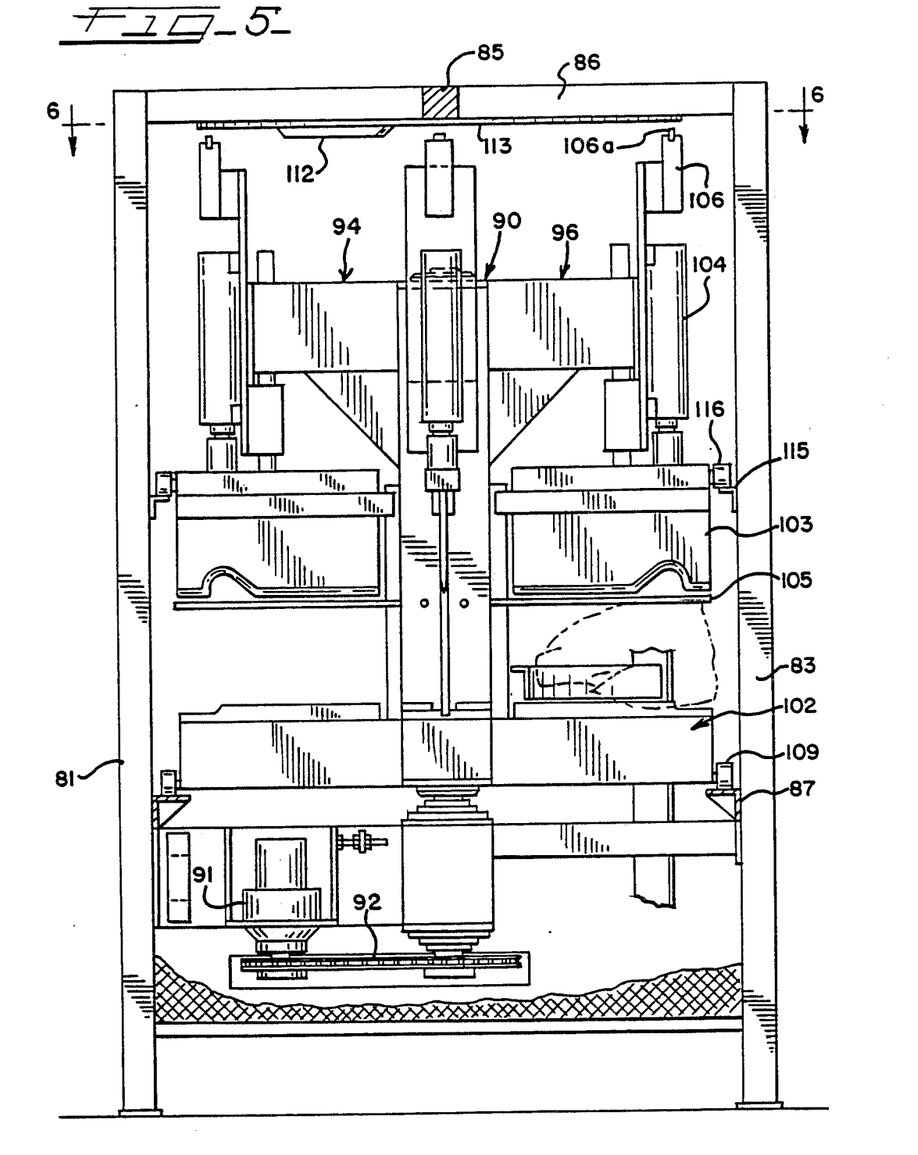
FIG. 5 is a vertical view of a modified head-splitting device according to the invention with some parts broken away for purposes of showing various elements.

This embodiment includes a frame having four circumferentially arranged upstanding posts 81, 82, 83, 84 interconnected at their upper ends by a pair of crossing braces 85 and 86 and likewise by lower cross braces not shown for purposes of clarity. Additionally, a continuous circular track 87 is secured to each of the posts at the lower portion of the device which adds to the overall stability of the posts. This track also serves to support the outer ends of the trays, as later explained.

Figure 6:
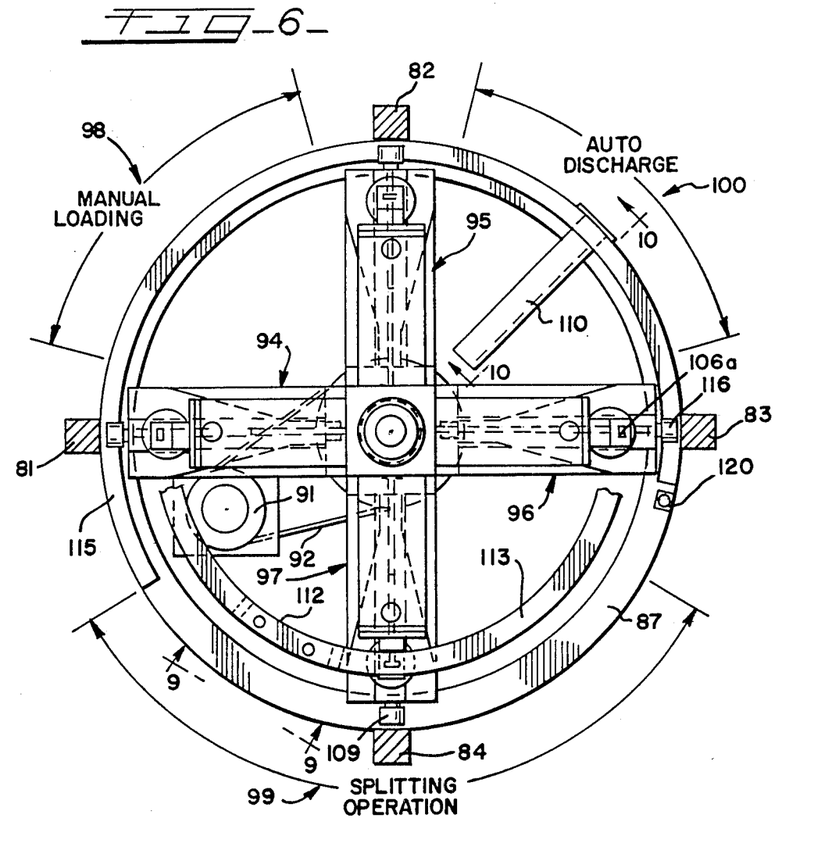
FIG. 6 is a top plan iew of the device taken along line 6—6 of FIG. 5.
Figure 7:
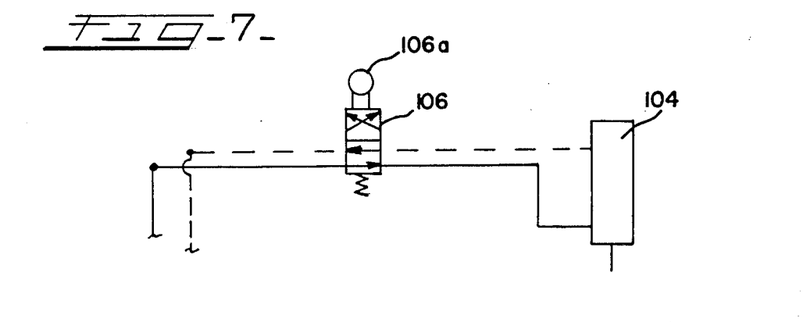
FIG. 7 is a hydraulic schematic view of the circuit controlling the operation of the head-splitting blade for one station.

This embodiment similarly includes a carriage 90 rotatably mounted in suitable bearings and driven by a hydraulic motor 91 mounted at the lower end of the frame and connected to the carriage through a suitable chain or belt drive system 92. Four head-splitting units 94, 95, 96, 97 are mounted on the carriage 90 and which are driven through a manual loading station 98, a head-splitting station 99 and an automatic discharge station 100. It should further be recognized that the head-splitting operation is automatic during the time the head-splitting units move through the station.

Each head-splitting unit generally includes a head tray or holder 102, a head-splitting blade 103 and a hydraulic cylinder 104 that actuates the blade through head-splitting and return strokes. Additionally, each unit includes a wiper 105 that is disposed above the head and which prevents any part of the split head from adhering to the blade upon the return stroke, thereby effectively wiping the head from the blade. Further, each unit includes a control valve 106 which is operated in the head-splitting station for effecting the head-splitting and return strokes of the blade 103.

Each tray 102 is mounted and supported at its inner end to the carriage 90 and provided with a roller 109 at its outer end which coacts with the supporting track 87 to maintain the holder in horizontal disposition during its entire rotational movement. In this respect, this embodiment differs from the embodiment of FIGS. 1 to 4 where the tray swings downwardly at the discharge station. At the discharge station 100, as seen particularly in FIGS. 6, 8 and 10, a plow or scraper 110 is fixed to the frame of the device and particularly mounted to the outer part of the frame serving to scrape or sweep the head from the holder as it moves through the discharge station. Thus, the scraper 110 is fixed at the discharge station and disposed to engage the split head when the head is being driven through the discharge station and separate the head from the holder allowing it to fall downwardly and be further handled in a suitable manner. Accordingly, the split head is automatically discharged from the tray at the discharge station.

The control valve 106 is conventional and includes a movable control rod with a cam follower 106a. The control rod is spring biased to return to home position after being depressed by a cam and thereafter released. The follower is disposed to engage the cam track 112 within the head-splitting station 99 to actuate the valve 106 and cause the cylinder 104 to drive the blade 103 through the head-splitting stroke and cause the splitting of a head in a manner depicted in FIG. 9 where the blade is shown in the down position and the head is shown in phantom and split. The cam 112 is mounted on an overhead rail 113 that is supported by the frame in a suitable manner. Thus, the head-splitting blade of each unit is operated through the head-splitting and return strokes only in the head-splitting station 99, while the head-splitting unit is driven through the station. The cam follower 16a, when initially engaging the cam 112 and during the time it is in engagement with the cam, causes the blade to descend and go through its head-splitting stroke and to remain in descended position until the cam follower leaves the cam 112. Since the cam follower is spring biased to return to its home position, when it moves from the position to cause descension of the blade to the home position, the blade driving cylinder 104 is caused to be actuated and drive the blade through the return stroke and to maintain that position until once again the cam follower is depressed by the cam 112.

In order to provide further safety to the operator and to prevent the blade from accidentally descending during rotation of the head-splitting units, guard rail 115 is mounted to the frame and particularly the upstanding posts and extends through the discharge and loading stations. This guard rail coacts with rollers or pins 116 secured to the outer end of the blades 103 whereby the rollers 116 ride above the guard rail 115 except in the head-splitting station. This guard system prevents accidental descending of the blade 103 especially in the loading station to guard against injury to the operator. As seen particularly in FIG. 6, the guard rail extends from a point between the head-splitting and discharge stations circumferentially to the head-splitting station.

Figure 8:
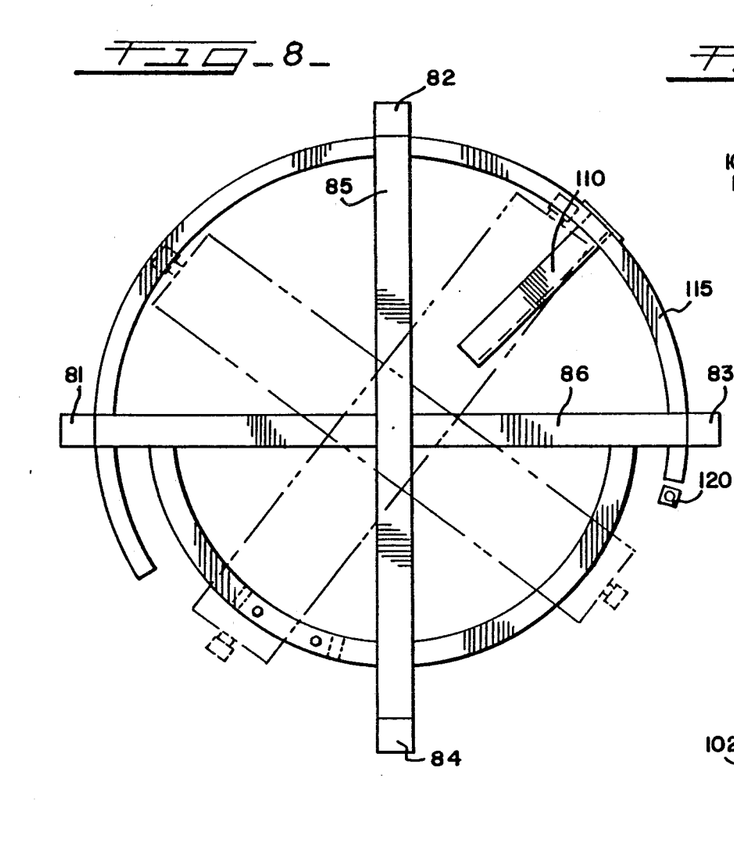
FIG. 8 is a somewhat schematic view in top plan showing the tracks and knife blade sensing and being similar to FIG. 6 but with parts removed for purposes of clarity.
Figure 9:
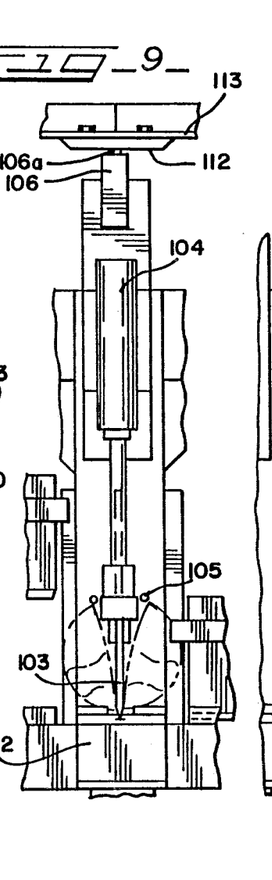
FIG. 9 is a detailed fragmentary view of one head-splitting unit in vertical elevation and showing the head-splitting blade in the down position.
Figure 10:
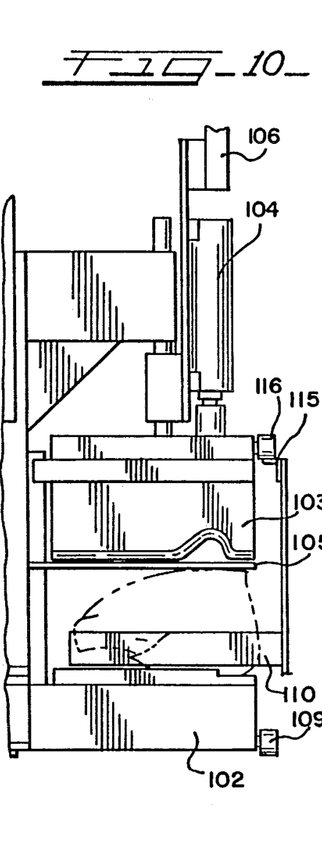
FIG. 10 is a side elevational view of a head-splitting unit illustrating the knife blade in the upper return position and also the manner in which the means for preventing the blade from descending in all stations except the headsplitting station.

To further guard against a possible malfunction of the hydraulic system driving the splitting blade 103 which might leave the blade in its down position as it leaves the splitting station, a suitable sensor 120 is disposed between the head-splitting and discharge stations that functions to sense the blade if it is not in the home position where the guard roller 116 is disposed above the guard rail 115. In the event of a malfunction and the disposition of the blade such that the roller 116 is below the guard rail 115, the sensor 120 is activated to stop the carriage drive means and suitably alert the operator so that the problem can be rectified.

It therefore may be appreciated that the embodiment of FIGS. 5 to 10 includes unique features that provide the utmost safety to the operator while at the same time providing a high production head-splitting device.

It may be further appreciated that while a hydraulic drive system for the carriage and the knife-splitting blades is illustrated, other types of systems may be utilized within the scope of the invention.

It will be understood that modifications and variations may be effected without departing from the scope of the novel concepts of the present invention, but it is understood that this application is to be limited only by the scope of the appended claims.

The invention is hereby claimed as follows:

1. A head splitter for splitting livestock heads comprising, a plurality of horizontally extending and circumferentially arranged head trays or holders, each tray or holder having means for orienting and holding a head in position for splitting, means securing the inner end of each tray or holder to a vertical shaft for rotation therewith, means for continuously driving the shaft and trays or holders so that the trays or holders move sequentially through circumferentially arranged loading, head-splitting and discharge stations, splitting means at and rotating with each tray or holder for splitting a head at the head-splitting station, said splitting means including a generally vertically positioned and reciprocably movable splitting blade, and means at the discharge station for removing the split head from each tray or holder.

2. A head splitter for splitting livestock heads comprising, a plurality of circumferentially arranged and normally horizontally disposed head trays, each tray or holder having means for orienting and holding a head in position for splitting, means pivotally mounting the inner end of each said tray to a vertical shaft so the outer end may swing downwardly, means for continuously driving the shaft and trays so the trays move sequentially through circumferentially arranged loading, head-splitting and discharge stations, head-splitting means at each tray movable therewith and aligned for splitting a head, said splitting means including a generally vertically positioned and reciprocably movable splitting blade, and means for maintaining each said tray in horizontal disposition in the loading and head-splitting stations and for permitting the outer end of each tray to swing downwardly at the discharge station to dump the split head.

3. The head splitter of claim 2, which further includes protective means over at least the head-splitting station for preventing a person from reaching into the station.

4. The head splitter of claim 2, which further includes means for driving said shaft and trays and for actuating said head-splitting means only in the head-splitting station.

5. The head splitter of claim 4, wherein said driving and actuating means is a hydraulic drive means.

6. The head splitter of claim 5, wherein said hydraulic drive means includes a motor for continuously rotationally driving said shaft and trays, and an electrically controlled hydraulic motor for each head-splitting means automatically operated only in said head-splitting station to perform a head-splitting operation.

7. The head splitter of claim 6, wherein each electrically controlled hydraulic motor includes a hydraulic cylinder operable by a solenoid actuated valve.

8. The head splitter of claim 2, wherein said means for maintaining each tray in horizontal disposition and permitting each tray to swing downwardly at the discharge station includes a cam track receiving cam followers attached to said tray.

9. A livestock head splitter comprising a frame, a vertically extending rotatable shaft mounted on the frame, a plurality of head trays for receiving livestock heads, each tray or holder having means for orienting and holding a head in position for splitting, said trays being circumferentially arranged and hingedly connected to the shaft, means driving the shaft and trays causing the trays to advance sequentially through a loading station, a headsplitting station and a discharge station, a vertically movable splitting blade for each head tray mounted to the shaft for rotation therewith, means driving the splitting blade to split the head in the tray as it moves through the head-splitting station, and means for normally maintaining the head trays horizontal and for permitting the head trays at the discharge station to swing downwardly to discharge the heads from the tray.

10. The livestock head splitter of claim 9, wherein said means for driving the shaft and trays and the splitting blades consist of a hydraulic drive means.

11. The livestock head splitter of claim 10, wherein said hydraulic drive means includes a motor for driving said shaft and trays and a hydraulic cylinder reciprocably driving each splitting blade.

12. The livestock head splitter of claim 11, wherein said hydraulic drive means further includes control means for actuating said hydraulic cylinders as the blades move through the head-splitting station.

13. The livestock head splitter of claim 12, wherein said control means includes electrically operated hydraulic valves and means at the head-splitting station for energizing said valves.

14. A rotatable livestock head splitter comprising, a plurality of circumferentially arranged and interconnected head-splitting units, means for continuously driving said units sequentially through loading, head-splitting and discharge stations, each unit including a horizontally extending head tray or holder for receiving and supporting a head, each tray or holder having means for orienting and holding a head in position for splitting, a vertically movable splitting blade positioned above the tray or holder, and means for driving the blade downwardly through a head-splitting stroke at the head-splitting station and upwardly through a return cycle, means at the head-splitting station for operating said blade driving means, and each said head tray being hingedly mounted at one end and supported at the other end by a cam follower riding on a cam track, said cam track allowing each said tray to swing downwardly at the cam follower end while each respective unit moves through the discharge station.

15. The rotatable head splitter of claim 15, which further includes a protective enclosure for the head-splitting units for preventing ingress except at the loading station.

16. A rotatable livestock head splitter comprising, a plurality of circumferentially arranged and interconnected head-splitting units, means for continuously driving said units sequentially through loading, head-splitting and discharge stations, each unit including a horizontally extending head tray or holder for receiving and supporting a head, each tray or holder having means for orienting and holding a head in position for splitting, a vertically movable splitting blade positioned above the tray or holder, and means for driving the blade downwardly through a head-splitting stroke at the head-splitting station and upwardly through a return cycle, means at the head-splitting station for actuating said blade driving means, and means at said discharge station for removing the heads from the trays as they move through said station.

17. The rotatable head splitter of claim 16, wherein said removing means includes a stationary plow or scraper disposed to separate the head from the tray during movement of the tray past the plow.

18. The rotatable head splitter of claim 16, which further includes means in the discharge and loading stations for preventing the blade from descending through the head-splitting stroke.

19. The rotatable head splitter of claim 18, wherein said means preventing the blade from descending includes a fixed track and means connected to the blade for coacting with the track.

20. The rotatable head splitter of claim 18, which further includes means disposed between the head-splitting discharge stations for sensing the position of said blade and for stopping said unit driving means when the blade is in the down position.

21. A device for splitting livestock heads comprising, a frame, a carriage rotatably mounted on the frame, means for continuously driving said carriage, a plurality of head-splitting units mounted on said carriage, each unit including a horizontally extending tray for supporting a head and a vertically movable knife blade for splitting the head, and means selectively driving said blade through head-splitting and return strokes to split a head supported on the tray, each tray or holder having means for orienting and holding a head in position for splitting, circumferentially arranged loading, head-splitting and discharge stations through which said units are sequentially driven, means at the head-splitting station for automatically causing operation of said knife blade drive means to split a head, and means at the discharge station for automatically discharging the split heads from the trays.

22. The device of claim 21, which further includes means for preventing the blade from descending through the head-splitting stroke except in the head-splitting station.

23. The device of claim 22, wherein said means preventing the blade from descending includes a fixed track and means connected to the blade for coacting with the track.

24. The device of claim 23, which further includes means disposed between the head-splitting discharge stations for sensing the position of said blade and for stopping said unit driving means when the blade is in the down position.

25. The device of claim 24, wherein said automatic discharge means includes a stationary plow or scraper secured to said frame and positioned to scrape the heads from the trays.

* * * * *